US009288635B2

(12) United States Patent
Yoo et al.

(10) Patent No.: US 9,288,635 B2
(45) Date of Patent: Mar. 15, 2016

(54) APPARATUS FOR MANAGING INDOOR MOVING OBJECT BASED ON INDOOR MAP AND POSITIONING INFRASTRUCTURE AND METHOD THEREOF

(71) Applicant: Electronics and Telecommunications Research Institute, Daejeon-si (KR)

(72) Inventors: Jae-Jun Yoo, Daejeon-si (KR); Su-Wook Ha, Daejeon-si (KR); So-Yeon Lee, Daejeon-si (KR); Kyong-Ho Kim, Daejeon-si (KR); Dong-Sun Lim, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 284 days.

(21) Appl. No.: 13/975,938

(22) Filed: Aug. 26, 2013

(65) Prior Publication Data
US 2014/0113661 A1  Apr. 24, 2014

(30) Foreign Application Priority Data

Oct. 18, 2012 (KR) .................. 10-2012-0116160

(51) Int. Cl.
G01C 21/12 (2006.01)
H04W 24/00 (2009.01)
G06K 9/00 (2006.01)
H04W 4/04 (2009.01)
G01S 5/02 (2010.01)
G01C 21/20 (2006.01)
H04W 4/02 (2009.01)

(52) U.S. Cl.
CPC ............. *H04W 4/043* (2013.01); *G01C 21/206* (2013.01); *G01S 5/0252* (2013.01); *H04W 4/028* (2013.01)

(58) Field of Classification Search
USPC .......................... 701/434; 455/456.1; 382/100
See application file for complete search history.

(56) References Cited

U.S. PATENT DOCUMENTS

| 8,107,446 | B2 | 1/2012 | Shoarinejad |
| 8,165,150 | B2 | 4/2012 | Aweya et al. |
| 8,229,458 | B2 * | 7/2012 | Busch .................. 455/456.1 |
| 8,400,359 | B2 | 3/2013 | Liu et al. |
| 2008/0077326 | A1 * | 3/2008 | Funk et al. ................. 701/220 |
| 2008/0263592 | A1 * | 10/2008 | Kimber et al. ................. 725/38 |
| 2009/0043504 | A1 * | 2/2009 | Bandyopadhyay et al. ................. 701/213 |
| 2009/0262974 | A1 * | 10/2009 | Lithopoulos .................. 382/100 |
| 2010/0039929 | A1 | 2/2010 | Cho et al. |

(Continued)

FOREIGN PATENT DOCUMENTS

| KR | 10-2008-0053116 | 6/2008 |
| KR | 10-1075257 | 10/2011 |

(Continued)

*Primary Examiner* — Thomas G Black
*Assistant Examiner* — Tyler Paige
(74) *Attorney, Agent, or Firm* — Kile Park Reed & Houtteman PLLC

(57) ABSTRACT

An apparatus for managing an indoor moving object based on an indoor map and positioning infrastructure and a method thereof, the apparatus including a database configured to store an indoor map and positioning information, and a controller configured to divide an indoor space into indoor partition spaces in semantic units by use of the indoor map and the positioning information, and to store and manage an index that defines a relationship between the indoor partition space in the semantic unit and a moving object.

15 Claims, 9 Drawing Sheets

(56) References Cited

U.S. PATENT DOCUMENTS

2012/0072106 A1* 3/2012 Han et al. .................. 701/410
2012/0158297 A1   6/2012 Kim et al.
2013/0131985 A1* 5/2013 Weiland et al. ............ 701/516

FOREIGN PATENT DOCUMENTS

| KR | 10-2012-0047539 | 5/2012 |
| KR | 10-2012-0069267 | 6/2012 |

* cited by examiner

FIG. 2

| | P1 | P2 | P3 | P4 | P5 | P6 | P7 | P8 | P9 | P10 | P11 | P12 | P13 | P14 | P15 | P16 | P17 | P18 | P19 | P20 | P21 | P22 | P23 | P24 | P25 |
|---|---|---|---|---|---|---|---|---|---|---|---|---|---|---|---|---|---|---|---|---|---|---|---|---|---|
| A1 | | | ○ | ○ | ○ | ○ | ○ | | | ○ | ○ | | ○ | | | | | | | | | | | | ○ |
| A2 | | ○ | ○ | | | | | | | | | | | | | | | | | | ○ | ○ | | ○ | ○ |
| A3 | | | | | | ○ | ○ | | ○ | | ○ | ○ | ○ | ○ | ○ | | | ○ | | | | | | | |
| A4 | | | | | ○ | | ○ | ○ | ○ | | | | ○ | | ○ | ○ | | ○ | ○ | | | ○ | ○ | ○ | ○ |

FIG. 3

| From | To | Positioning Device ID | From | To | Positioning Device ID | From | To | Positioning Device ID | From | To | Positioning Device ID |
|---|---|---|---|---|---|---|---|---|---|---|---|
| P1 | P2 | +A2 | P5 | P8 | -A1 | P12 | P11 | +A1 | P20 | P18 | +A3, +A4 |
|  | P3 | +A1, +A2 |  | P9 | -A1, +A3 |  | P13 | +A1, +A4 |  | P21 | +A2 |
|  | P4 | +A1 |  | P24 | -A1, +A2 |  | P15 | +A4 |  | P22 | +A2, +A4 |
| P2 | P1 | -A2 | P6 | P25 | +A2 | P13 | P11 | -A4 | P21 | P19 | -A2, +A4 |
|  | P3 | +A1 |  | P4 | -A3 |  | P12 | -A1, -A4 |  | P20 | -A2 |
|  | P22 | +A4 |  | P5 | -A3, +A4 |  | P15 | -A1 |  | P22 | +A4 |
|  | P24 | +A4 |  | P7 | +A4 |  | P15 | +A4 | P22 | P2 | -A4 |
|  | P25 | +A1, +A4 |  | P4 | -A3, -A4 | P14 | P16 | -A3, +A4 |  | P18 | -A2, +A3 |
| P3 | P1 | -A1, -A2 | P7 | P5 | -A3 |  | P17 | -A3 |  | P20 | -A2, -A4 |
|  | P2 | -A1 |  | P6 | -A4 | P15 | P12 | -A4 |  | P21 | -A4 |
|  | P4 | -A2 |  | P8 | -A1, -A3 |  | P13 | +A1 |  | P23 | -A2 |
|  | P5 | -A2, +A4 |  | P9 | -A1 |  | P14 | -A4 | P23 | P15 | +A3 |
|  | P24 | -A1, +A4 |  | P5 | +A1 |  | P16 | -A3 |  | P22 | +A2 |
|  | P25 | +A4 |  | P7 | +A1, +A3 |  | P17 | -A3, -A4 | P24 | P2 | -A4 |
| P4 | P1 | -A1 | P8 | P9 | +A3 |  | P23 | -A3 |  | P3 | +A1, -A4 |
|  | P2 | -A1, +A2 |  | P24 | +A2 |  | P14 | +A3, -A4 |  | P5 | +A1, -A2 |
|  | P3 | +A2 |  | P25 | +A1, +A2 | P16 | P15 | +A3 |  | P8 | -A2 |
|  | P5 | +A4 | P9 | P5 | +A1, -A3 |  | P17 | -A4 | P25 | P2 | -A1, -A4 |
|  | P6 | +A3 |  | P7 | +A1 |  | P14 | +A3 |  | P3 | -A4 |
|  | P7 | +A3, +A4 |  | P8 | -A3 | P17 | P15 | +A3, +A4 |  | P4 | -A2, -A4 |
|  | P25 | +A2, +A4 | P10 | P11 | +A3 |  | P16 | +A4 |  | P5 | -A2 |
| P5 | P3 | +A2, -A4 | P11 | P10 | -A3 | P18 | P19 | -A3 |  | P8 | -A1, -A2 |
|  | P4 | -A4 |  | P12 | -A1 | P19 | P20 | -A4 |  | P24 | -A1 |
|  | P6 | +A3, -A4 |  | P13 | +A4 |  | P21 | +A2, -A4 |  |  |  |
|  | P7 | +A3 |  | P15 | -A1, +A4 |  | P22 | +A2 |  |  |  |

APPARATUS FOR MANAGING INDOOR MOVING OBJECT BASED ON INDOOR MAP AND POSITIONING INFRASTRUCTURE AND METHOD THEREOF

CROSS-REFERENCE TO RELATED APPLICATION

This application claims the benefit under 35 U.S.C. §119 (a) of a Korean Patent Application No. 10-2012-0116160, filed on Oct. 18, 2012, the entire disclosure of which is incorporated herein by reference for all purposes.

BACKGROUND

1. Field

The following description relates to a technology for efficiently storing and managing location-related information about a moving object to provide a location-based service in an indoor space.

2. Description of the Related Art

As indoor spaces are becoming complex, for example, a large shopping mall or a convention center, and as people spend the majority of the time inside a building, various types of services based on indoor location information are becoming important and many studies are conducted on these services. These studies have become more active as the performance of mobile terminals, such as smartphones, is improved and various indoor positioning methods are applied to a real life situation. Examples of indoor space-based services include an indoor navigation service to guide a road inside and an indoor emergency rescue service to help evacuation in an emergency.

The indoor location-based services are implemented on the premise that a position of a moving object corresponding to a user or a mobile terminal is precisely recognized. In other words, only when the position of the moving object needs to be measured indoors, and information about where the corresponding moving object is located needs to be stored and managed, a service based on the position of the moving object is provided to a user.

A method of storing and managing information about a position of a moving object in an indoor space has various constraints, for example, an entrance and a limited moving path, unlike outdoor spaces. Accordingly, there is a need for position information storage and management considering such constraints. Actually, an existing position information storage and management method of an outdoor space may be used, but storage and management considering indoor constraints ensures a more efficient management. However, there is no remarkable suggestion on the efficient storage and management of the position of the moving object considering the nature of indoor spaces.

SUMMARY

The following description relates to an apparatus for managing an indoor moving object based on an indoor map and positioning infrastructure, capable of efficiently storing and managing position-related information of a moving object that moves in an indoor space, and a method thereof.

In one general aspect, an apparatus for managing an indoor moving object includes a database and a controller. The database may be configured to store an indoor map and positioning information. The controller may be configured to divide an indoor space into indoor partition spaces in semantic units by use of the indoor map and the positioning information, and to store and manage an index that defines a relationship between the indoor partition space in the semantic unit and a moving object.

The indoor map may include information about a constraint that limits movement of the moving object due to a structure of the indoor space. The positioning information may include at least one of position information, an identifier, installation information, and information about a coverage of a positioning device configured to measure a position of the moving object in the indoor space. The indoor partition space in the semantic unit may represent a space in which movement of the moving object is not limited due to a structure of the indoor space and which is included in a coverage of sets of the same positioning device.

The controller may recognize movement of the moving object among the indoor partition spaces by determining a moving object, which is located in a predetermined indoor partition space, or an indoor partition space, in which a predetermined moving object is located, from the index between the indoor partition space and the moving object stored in the database.

The controller may include an indoor map manager configured to manage the indoor map, a positioning information manager configured to manage the positioning information, an indoor partition space manager configured to divide an indoor space into indoor partition spaces in semantic units by use of information about the indoor map and the positioning information, and to manage the indoor partition spaces divided in the semantic units, and an index manager configured to store and manage a position relationship between the indoor partition space and the moving object as an index.

The indoor partition space manager may determine movement of the moving object among the indoor partition spaces, and the index manager may store and manage an index that defines a position relationship between the indoor partition space and the moving object that is determined through the indoor partition space manager in the database.

The indoor partition space manager, if a predetermined positioning device senses a new moving object, may receive sensing information from the predetermined positioning device, and determine that the new moving object has moved from an indoor partition space corresponding to a coverage of a previous positioning device to an indoor partition space corresponding to a coverage of the predetermined positioning device.

The indoor partition space manager, if a predetermined moving object senses a new positioning device, may receive sensing information from the predetermined moving object, and determine that the predetermined moving object has moved from an indoor partition space corresponding to a coverage of a previous positioning device to an indoor partition space corresponding to a coverage of the new positioning device.

The index manager, if determined by the indoor partition space manager that the moving object has moved among the indoor partition spaces, may update the index between the moving object and the indoor partition space according to the movement of the moving object in the database.

The index manager may search for a moving object located in a predetermined indoor partition space or an indoor partition space in which a predetermined moving object is located, by use of the index between the indoor partition space and the moving object stored in the database.

The index between the indoor partition space and the moving object managed by the index manager may be a spatial index or a spatiotemporal index.

The apparatus may further include a communicator configured to receive an inquiry and a service request from a service requester to provide a processed result, and to receive position information about the moving object from the moving object or the positioning device.

In another general aspect, a method of managing an indoor moving object includes receiving an indoor map and positioning information, dividing an indoor space into indoor partition spaces in semantic units by use of the received indoor map and positioning information, and generating an index that defines a relationship between the indoor partition space in the semantic unit and a moving object, and storing and managing the index in a database.

As apparent from the above, the present disclosure can efficiently and precisely provide a user with various types of indoor location information-based services, which are based on a position of a moving object, by considering various constraints of an indoor space.

Other features and aspects will be apparent from the following detailed description, the drawings, and the claims.

BRIEF DESCRIPTION OF THE DRAWINGS

FIG. 2 is a table showing coverages of positioning devices with respect to respective indoor partition spaces illustrated in FIG. 1 in accordance with an embodiment of the present disclosure.

FIG. 3 is a table showing a transition between indoor partition spaces in accordance with an embodiment of the present disclosure.

Figure 1:
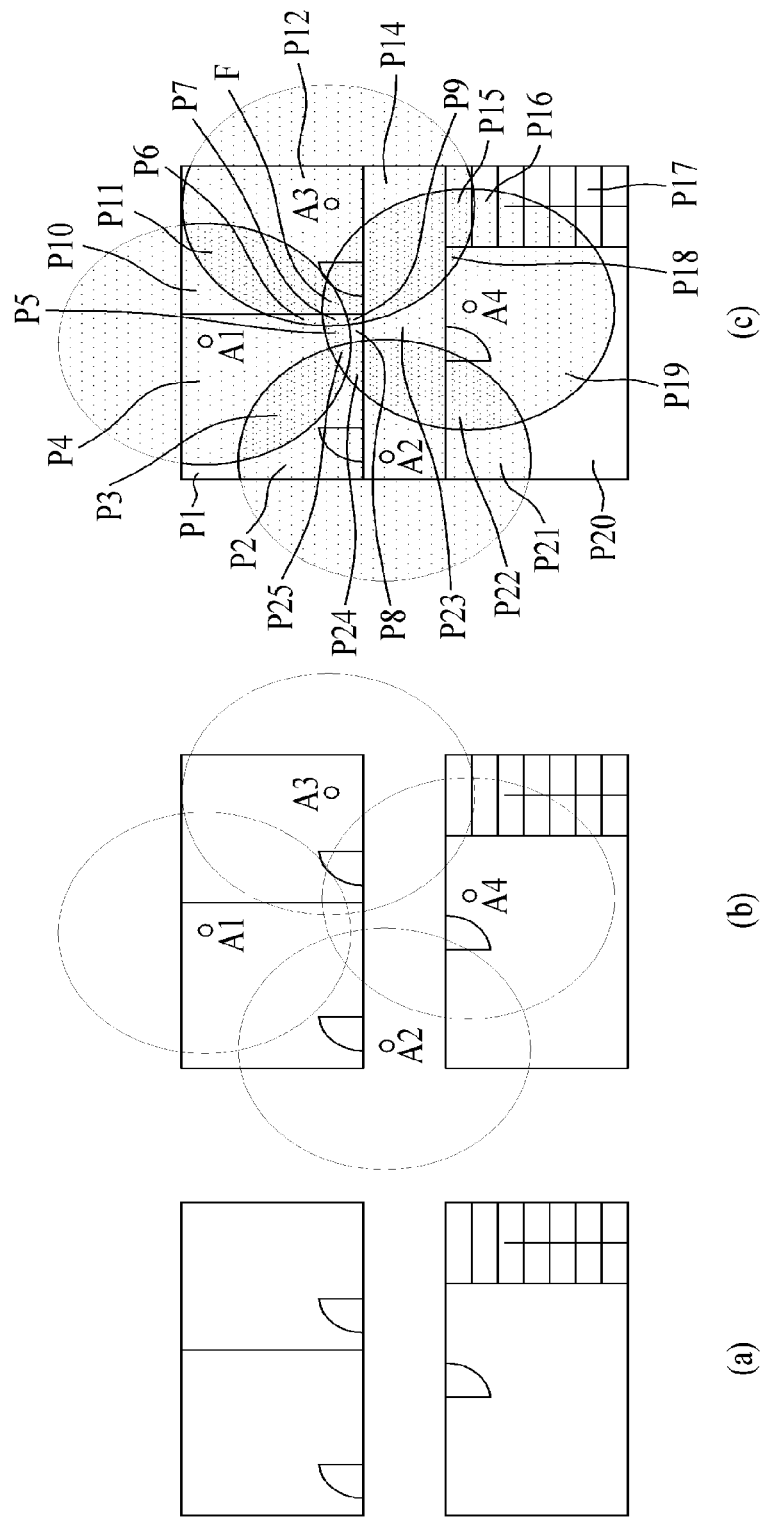
FIG. 1 is a reference diagram illustrating an example of an indoor map, a positioning infrastructure, and an indoor partition space of an indoor space applied with the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. In addition, terms described below are terms defined in consideration of functions in the present invention and may be changed according to the intention of a user or an operator or conventional practice. Therefore, the definitions must be based on content throughout this disclosure.

An apparatus for managing an indoor moving object in accordance with an embodiment of the present disclosure stores and manages position-related information about an indoor moving object, based on an indoor map and positioning infrastructure. The indoor map includes information about a constraint that limits movement of a moving object due to a structure of an indoor space. The indoor map may be provided in the form of 2D or 3D. The positioning infrastructure includes position information, an identifier, installation information, and information about a coverage of a positioning device configured to measure the position of a moving object that moves in an indoor space. The moving object may be an electronic device carried by a user or a user carrying an electronic device in an indoor space. The electronic device may be a mobile terminal capable of communication, for example, a smartphone.

The apparatus for managing the indoor moving object in accordance with the present disclosure divides an indoor space into indoor partition spaces in semantic units using the above-described indoor map and positioning information, and stores and manages position-related information about a moving object in the indoor partition space in the semantic unit. The indoor partition space in the semantic unit represents a space in which movement of the moving object is not limited due to a structure of the indoor space and which is included in a coverage of sets of the same positioning device.

As described above, the present disclosure ensures more efficient storage and management of position-related information about a moving object by reflecting various constraints of an indoor space, for example, a positioning method, the structure of an indoor space, and conditions involving access limitation, unlike an outdoor space. Hereinafter, embodiments of the present disclosure will be described in detail with reference to accompanied drawings.

FIG. 1(a) illustrates a map of an indoor space applied with the present disclosure, and FIG. 1(b) illustrates the placement of positioning devices A1 to A4 formed in the corresponding indoor space.

Referring to FIG. 1(a), movement of a moving object is limited by an entrance, a corridor, and a room in an indoor space, and the indoor map has information about constraints that limit the movement of the moving object due to the structure of the indoor space.

Referring to FIG. 1(b), the positioning devices A1 to A4 may be embodied in various types depending on indoor positioning technology being used. In accordance with the present disclosure, a proximity-based positioning technique (Bluetooth) including an RFID (Radio-Frequency Identification) reader and a RFID tag, and a WiFi-based positioning technique are used. As for the proximity-based positioning technique, the positioning devices A1 to A4 represent RFID readers, and radiuses of the positioning devices A1 to A4 represent radiuses in which the positioning devices A1 to A4 recognize a tag. The RFID tag is mounted on a moving object. As for the WiFi-based indoor positioning technique, the positioning devices A1 to A4 represent access points, and radiuses of the positioning devices A1 to A4 represent ranges in which the positioning devices A1 to A4 make an access to a WiFi access point.

The sematic division of the indoor space suggested by the present disclosure is performed on that assumption that the locations and the radiuses of the positioning devices A1 to A4 are known. Depending on the type of the positioning technique being used, the coverage of recognition of each of the positioning devices A1 to A4 may have a different meaning, and accordingly, details of a method and process of determining the position of a moving object may vary.

FIG. 1(c) is a view illustrating an example of dividing an indoor space into sematic partition spaces based on the indoor map of FIG. 1(a) and the placement information of the positioning devices of FIG. 1(b) in accordance with an embodiment of the present disclosure.

Referring to FIG. 1(c), the semantic partition space represents a region in which movement of the moving object is not limited due to a structure of the indoor space and which is included in a coverage of sets of the same positioning device. For example, a region P4 of FIG. 1(c) is included in a coverage of the positioning device A1, and a region P3 is included in a coverage of the positioning device A1 and a coverage of the positioning device A2. Regions P12 and P14 are included only in a coverage of the positioning device A3 in common, but according to the indoor map, the regions P12 and P14 do not allow movement therebetween, and thus are divided into two spaces.

The space divided based on the indoor map and the positioning information may be interpreted as a single semantic location allowing a moving object to exist therein, unless an additional change is made in the positioning information, for example, included in a coverage of a new positioning device or excluded from a previous coverage. That is, a moving object may be interpreted as existing at a certain point of the sematic locations and moving between the semantic locations.

The present disclosure suggests a system for dividing an indoor space into indoor partition spaces as semantic spaces using an indoor map and positioning information, determining the position of a moving object from movement of the moving object between indoor partition spaces, and storing and managing position-related information.

FIG. 2 is a table showing coverages of the positioning devices A1 to A4 with respect to respective indoor partition spaces illustrated in FIG. 1 in accordance with an embodiment of the present disclosure.

Referring to FIG. 2, as an example of coverages of the positioning devices A1 to A4, the region P4 is included in a coverage of the positioning device A1, and the region P3 is included in both of the coverages of the positioning devices A1 and A2. A transition section, representing an access path, may exist between indoor partition spaces. However, a transition section does not always exist between indoor partition spaces since the movement of a moving object may be limited by an indoor map even for a region included in a coverage of a positioning device. Accordingly, a transition between indoor partition spaces may be defined in advance by access constraints of the indoor map.

FIG. 3 is a table showing a transition between indoor partition spaces in accordance with an embodiment of the present disclosure.

The table of FIG. 3 may be expressed in the form of a finite state machine or a graph. As to explain a part of FIG. 3, if a moving object having been located in a partition space P1 newly senses the positioning device A2, the moving object is regarded as being moved to a partition space P2, and a moving object having been located in a partition space P5 escapes from a coverage of the positioning device A1, the moving object is regarded as being moved to a partition space P8. Referring to FIG. 3, a sign of + denoted at the positioning device represents entering a coverage of a corresponding positioning device, and a sign of − denoted at the positioning device represents escaping from a coverage of a corresponding positioning device.

As an exception, if a moving object having been located in a partition space P2 newly enters a coverage of the positioning device A4, the corresponding moving object may be located in a partition space P22 or a partition space P24. The reason why the spaces P22 and P24 are divided from each other as separate spaces is that reciprocal accesses between the two spaces are impossible according to the indoor map. In this case, the apparatus for managing the indoor moving object may store and manage information indicating that the corresponding moving object is likely to exist in the partition space P22 or the partition space P24, and as the moving object additionally moves, may determine where the moving object has been located in practice. In this case, if there is a need to provide a position-related service of a moving object to a user of the moving object based on the above description, the apparatus for managing the indoor moving object needs to provide the corresponding information in consideration of such an exceptional case.

Figure 4:
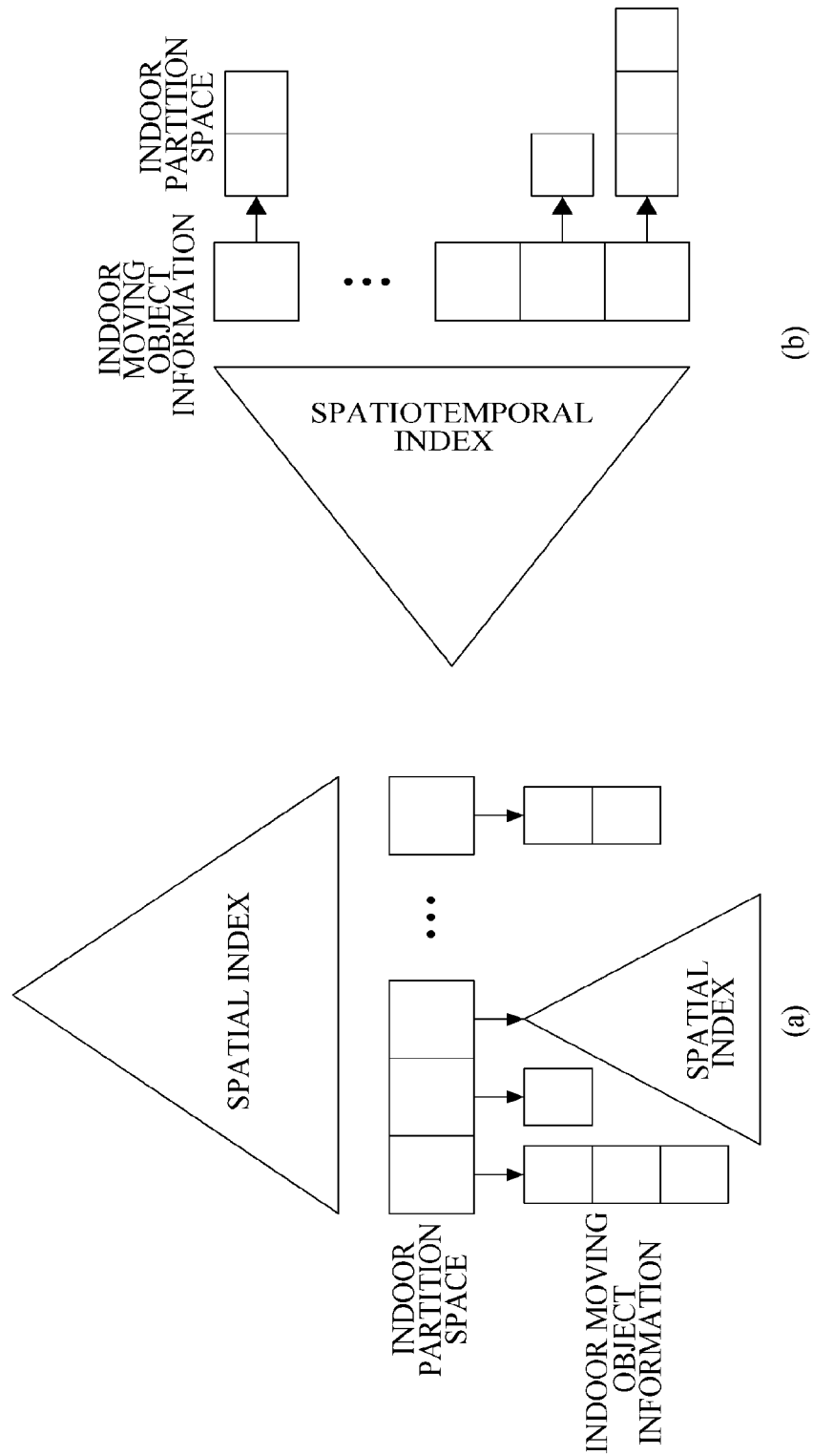
FIG. 4 is a structure chart of an index to support a mutual searching between an indoor partition space and a moving object in accordance with various embodiments of the present disclosure.

FIG. 4 is a structure chart of an index to support a mutual searching between an indoor partition space and a moving object in accordance with various embodiments of the present disclosure.

Referring to FIG. 4, the apparatus for managing the indoor moving object in accordance with the present disclosure stores and manages an index that defines a relationship between the indoor partition space in the semantic unit and the moving object in a database.

The index between the indoor partition space and the moving object supports a mutual searching function. That is, using an index between an indoor partition space and a moving object, a moving object located in a predetermined indoor partition space may be searched, or on the contrary, an indoor partition space in which a predetermined moving object is located may be searched.

The index searching may be provided by use of a spatial index structure, such as an R-tree, and a hash table. Alternatively, when there is a need to search for an index by considering a temporal element in addition to a spatial element, for example, storage of a position according to a certain period of time rather than considering a current position of each moving object, a spatiotemporal index structure may be used.

In detail, FIG. 4(a) shows as an example of constructing a structure to search for a moving object existing in a certain indoor partition space in a rapid manner, in which respective indoor partition spaces are searched using a spatial index, and moving objects located in the searched indoor partition spaces are searched for using a hash table or another spatial index. FIG. 4(b) shows a spatiotemporal index structure when there is a need to search for an indoor partition space where a certain moving object exists.

The semantic division of the indoor space using the indoor map and the positioning information and the construction of the corresponding index may be updated according to a change of the indoor map, the change of the positioning information, or the movement of the moving object. As the indoor map or the positioning information is changed, the information about the division of the indoor space is updated, and as the position of the moving object is changed, the index between the moving object and the indoor partition space is updated. Since the update of a position in the indoor space is performed with regard to the position of the positioning device, much a less number of updates take place when compared to the outdoor space.

Figure 5:
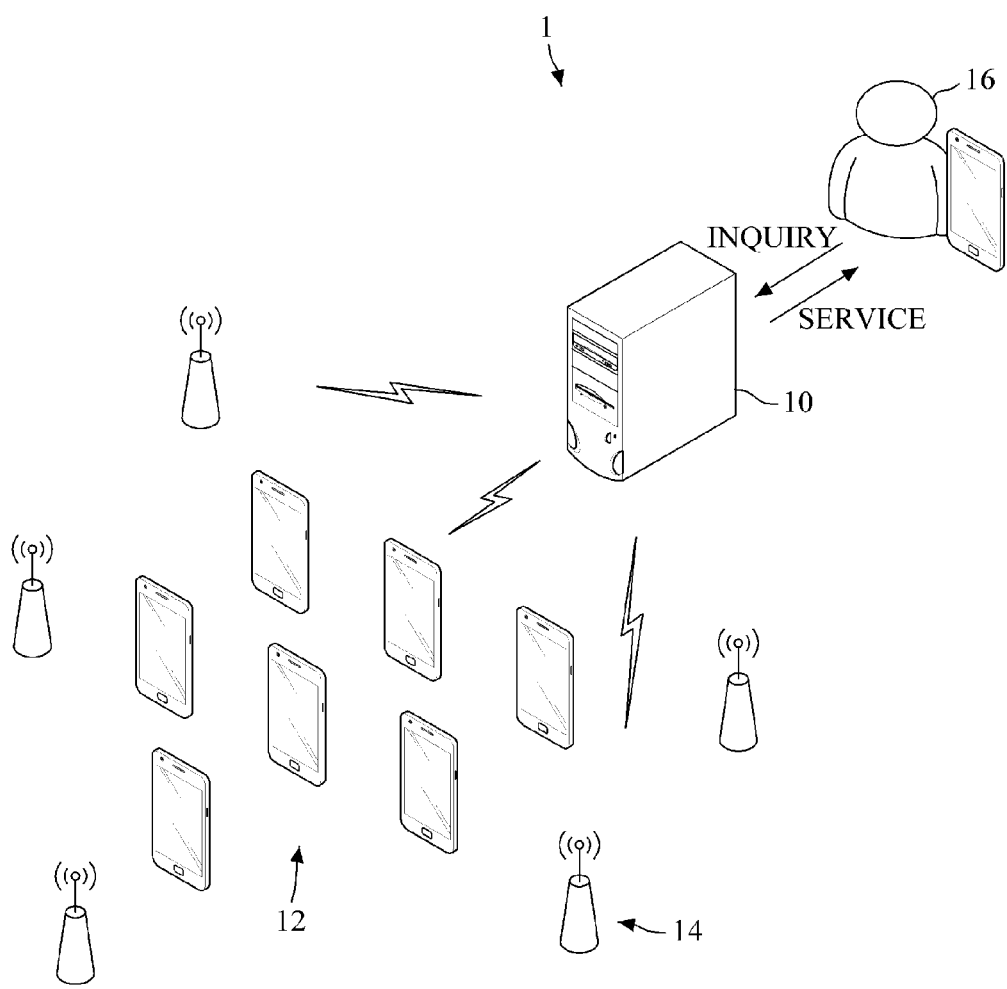
FIG. 5 is a diagram illustrating a configuration of a system for managing an indoor moving object in accordance with an embodiment of the present disclosure.

FIG. 5 is a diagram illustrating a configuration of a system 1 for managing an indoor moving object in accordance with an embodiment of the present disclosure.

Referring to FIG. 5 the system 1 for managing the indoor moving object includes an indoor moving object managing apparatus 10, a moving object 12, and a positioning device 14.

The positioning device 14 is installed in an indoor space, and as the moving object 12 moves in the indoor space, the position of the moving object 12 is transmitted to the indoor moving object managing apparatus 10 via the positioning device 14. Each of the moving object 12 and the positioning device 14 may be provided in plural numbers as shown in FIG. 5.

The positioning method of the moving object 12 is variously implemented. As an example, in case of an RFID scheme of the proximity-based positioning method, RFID readers representing the positioning devices 14 recognize the moving objects 12 on which tags are mounted, and transmit recognized information to the indoor moving object managing apparatus 10, thereby notifying which positioning device recognizes which moving object.

As another example, in case of a WiFi-based positioning scheme, the moving objects 12 recognize WiFi access points representing the positioning devices 14, and transmit information about the recognized WiFi access points to the indoor moving object managing apparatus 10, thereby notifying position information of the moving object 12. That is, depending on the positioning method, a subject which transmits the position and the positioning-related information to the indoor moving object managing apparatus 10 may vary, but the transmitting is regarded as the same from the view point of the indoor moving object managing apparatus 10, and is used to determine which moving object exists in which indoor partition space.

As the indoor moving object managing apparatus 10 stores and manages the position information about the moving object 12 existing in the indoor pace, a user 16 who desires to use a position-related service transmits an inquiry message to the indoor moving object managing apparatus 10 and receives a reply message from the indoor moving object managing apparatus 10 in response to the inquiry message, so that the user 16 receives a service based on the position of the moving object 12.

Figure 6:
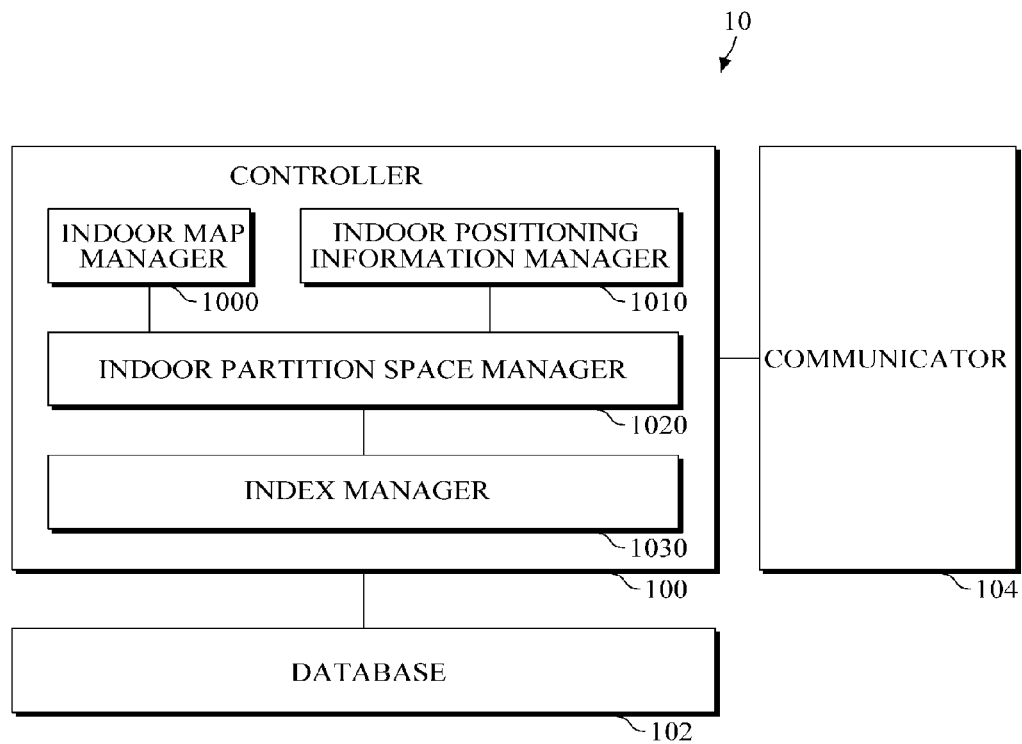
FIG. 6 is a diagram illustrating a configuration of an apparatus for managing an indoor moving object in accordance with an embodiment of the present disclosure.

FIG. 6 is a diagram illustrating a configuration of an apparatus for managing an indoor moving object in accordance with an embodiment of the present disclosure.

Referring to FIG. 6, the indoor moving object managing apparatus 10 includes a controller 100, a database 102, and a communicator 104. The controller 100 may include an indoor map manager 1000, a positioning information manager 1010, an indoor partition space manager 1020, and an index manager 1030.

The indoor map manager 1000 manages an indoor map. The indoor map may include information about constraints that limit the movement of a moving object due to a structure of an indoor space. The positioning information manager 1010 manages positioning information. The positioning information includes position information, an identifier, installation information, and information about a coverage of a positioning device configured to measure the position of a moving object. The indoor map and the positioning information are stored in the database 102.

The indoor partition space manager 1020 divides an indoor space into indoor partition spaces in semantic units by use of information about the indoor map and the positioning information, and manages the indoor spaces divided in semantic units. The indoor partition space in the semantic unit represents a space in which movement of the moving object is not limited due to a structure of the indoor space and which is included in a coverage of sets of the same positioning device. The index manager 1030 stores and manages the position relationship between the indoor partition space and the moving object as an index in the database 102.

In accordance with an embodiment of the present disclosure, the indoor partition space manager 1020 determines movement of a moving object between indoor partition spaces, and stores an index, which defines a position relationship between an indoor partition space and a moving object that is determined through the indoor partition space manager 1020, in the database 102.

As an example of determining movement of a moving object between indoor partition spaces, the indoor partition space manager 1020, if a predetermined positioning device senses a new moving object, receives sensing information from the predetermined positioning device, and determines that the new moving object has moved from an indoor partition space corresponding to a coverage of a previous positioning device to an indoor partition space corresponding to a coverage of the predetermined positioning device.

As another example, the indoor partition space manager 1020, if a predetermined moving object senses a new positioning device, receives sensing information from the predetermined moving object, and determines that the predetermined moving object has moved from an indoor partition space corresponding to a coverage of a previous positioning device to an indoor partition space corresponding to a coverage of the new positioning device.

The index manager 1030, if determined by the indoor partition space manager 1020 that the moving object has moved between the indoor partition spaces, updates the index between the moving object and the indoor partition space according to the movement of the moving object in the database 102.

The index manager 1030 may search for a moving object located in a predetermined indoor partition space or an indoor partition space in which a predetermined moving object is located, by use of the index between the indoor partition space and the moving object stored in the database 102. The index between the indoor partition space and the moving object managed by the index manager 1030 may be a spatial index or a spatiotemporal index.

The communicator 104 receives an inquiry and a request for services from a service requester, and provides a result of processing. In addition, the communicator 104 receives position information about the moving object from the moving object or the positioning device.

Figure 7:
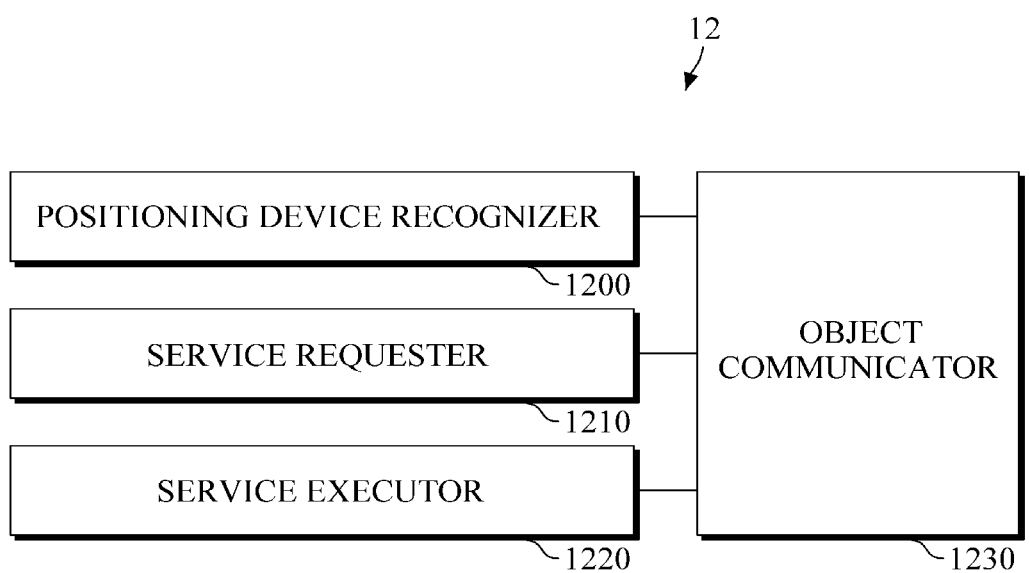
FIG. 7 is a diagram illustrating a configuration of a moving object in accordance with an embodiment of the present disclosure.

FIG. 7 is a diagram illustrating a configuration of the moving object 12 in accordance with an embodiment of the present disclosure.

Referring to FIGS. 5 and 7, the moving object 12 includes a positioning device recognizer 1200, a service requester 1210, a service executor 1220, and an object communicator 1230.

The moving object 12 may collectively represent a mobile terminal available for a user to carry indoors, for example, a smartphone, or a user of the mobile terminal. The positioning device recognizer 1200 recognizes the positioning device 14, which measures the position of the mobile object 12 indoors, through communication with the positioning device 14. The service requester 1210 makes a position-related inquiry and service request to the indoor moving object managing apparatus 10, and receives a result of processing from the indoor moving object managing apparatus 10. The service executor 1220 executes a location-based service by use of the result received from the indoor moving object managing apparatus 10. The object communicator 1230 transmits and receives the positioning information and the service request information.

Figure 8:
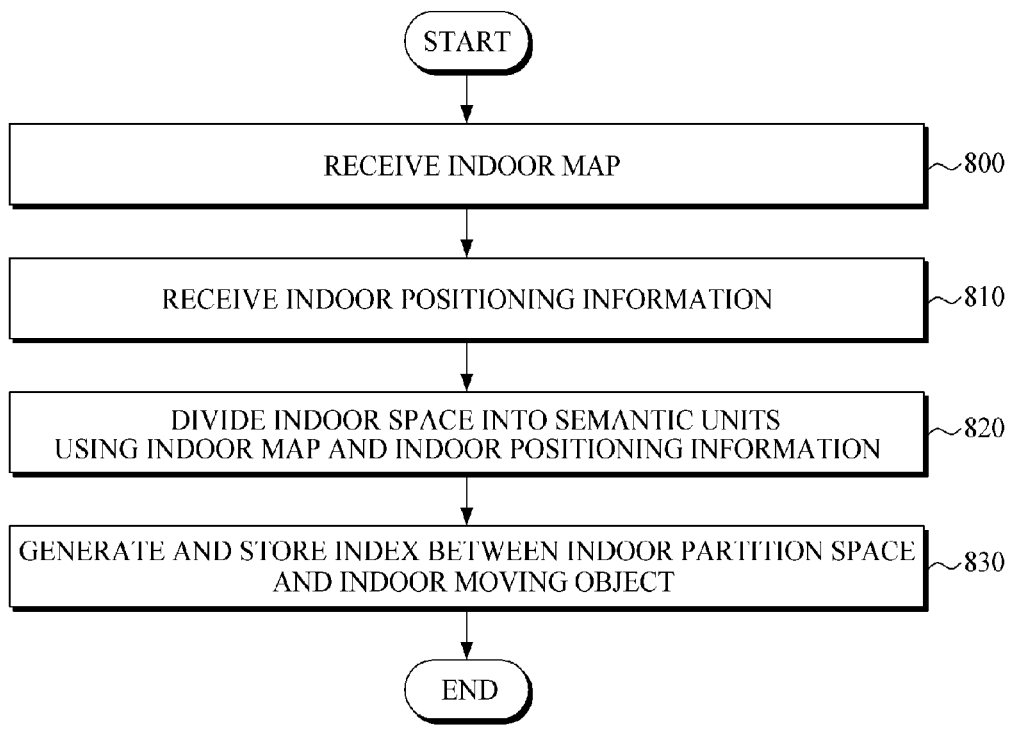
FIG. 8 is a flowchart showing a process of constructing an indoor partition space needed to store and search position-related information about a moving object in accordance with an embodiment of the present disclosure.

FIG. 8 is a flowchart showing a process of constructing an indoor partition space necessary to store and search position-related information about a moving object in accordance with an embodiment of the present disclosure.

Referring to FIG. 8, in order to store and manage position-related information about a moving object, an indoor moving object managing apparatus divides an indoor space into indoor partition spaces in semantic units based on an indoor map and positioning information, and constructs an index enabling a mutual searching between the indoor partition space and the moving object.

In detail, the indoor moving object managing apparatus receives an indoor map (800), receives indoor positioning information (810), and then divides an indoor space into indoor partition spaces in semantic units by use of the received indoor map and the indoor positioning information (820). If the indoor partition space is determined, the indoor moving object managing apparatus generates an index capable of mutual searching between the moving object and the indoor partition space and stores the generated index (830). In this manner, an index to store and manage position information about a moving object, which is received by the indoor moving object managing apparatus, is constructed, and the index may be updated according to the movement of the moving object.

Figure 9:
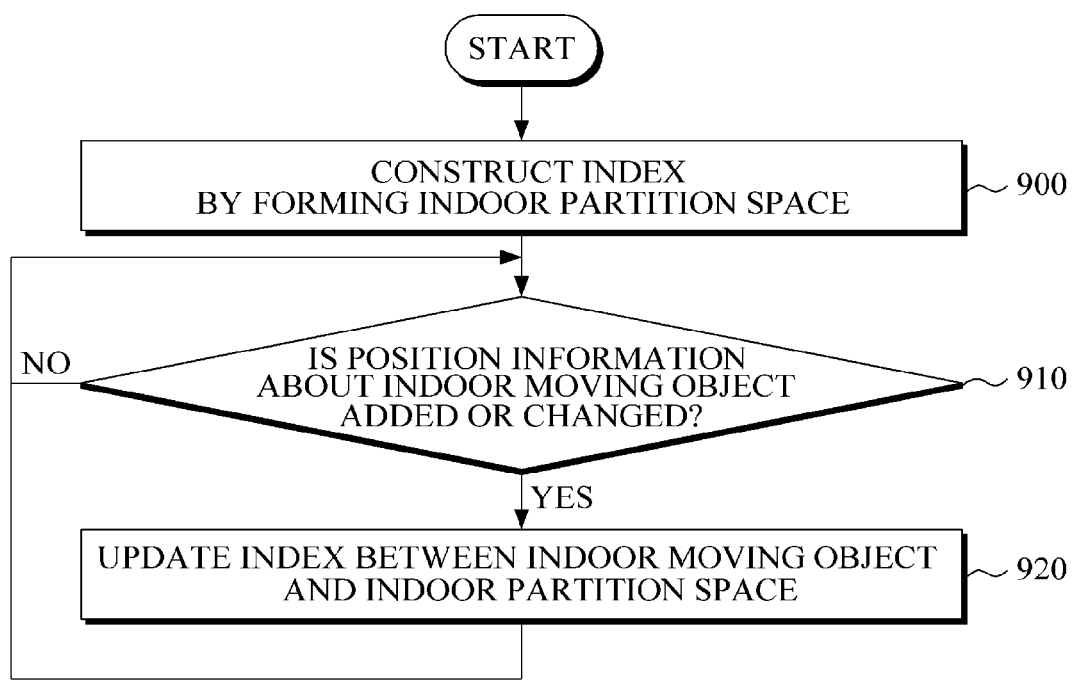
FIG. 9 is a flowchart showing a process of recognizing a change in position according to movement of a moving object and updating in accordance with an embodiment of the present disclosure.

FIG. 9 is a flowchart showing a process of recognizing a change in position according to movement of a moving object and updating in accordance with an embodiment of the present disclosure.

Referring to FIG. 9, after an index for a mutual searching between an indoor partition space and a moving object is constructed, the indoor moving object managing apparatus, if the moving object moves, recognizes the change in position of the moving object, and updates position-related information.

In detail, if an indoor partition space is formed according to the process shown in FIG. 8 and an index for mutual searching of the moving object is constructed based on the indoor partition space (900), it is determined whether position information about the moving object has been added or changed later (910). If determined that the position information has not been added or changed, an additional process is not performed, and if determined that the position has been added or changed, the corresponding index is updated (920).

In addition to the process described with reference to FIGS. 8 and 9, the user of the mobile object may make a position-related inquiry and service request to the indoor moving object managing apparatus, and receive a result of processing.

The above described moving object managing technique is a representative example to store and manage information about various types of moving objects that move in an indoor space, and a similar function may be provided by further considering an additional function based on the foregoing structure and suggesting a structure. For example, a similar function may be provided by changing some part of detailed modules depending on a method of measuring the position of a moving object.

The present invention can be implemented as computer readable codes in a computer readable record medium. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for managing an indoor moving object, the apparatus comprising:
   a database configured to store an indoor map and positioning information of positioning devices; and
   a controller configured to divide an indoor space into indoor partition spaces in semantic units by use of the indoor map and the positioning information, and to store and manage an index that defines a relationship between the indoor partition space in the semantic unit and a moving object, wherein the indoor partition space in the semantic unit represents a space in which movement of the moving object is not limited due to a structure of the indoor space and which is included in a coverage of sets of the same positioning device.

2. The apparatus of claim 1, wherein the indoor map comprises information about a constraint that limits movement of the moving object due to the structure of the indoor space.

3. The apparatus of claim 1, wherein the positioning information comprises at least one of position information, an identifier, installation information, and information about a coverage of a positioning device configured to measure a position of the moving object in the indoor space.

4. The apparatus of claim 1, wherein the controller recognizes movement of the moving object among the indoor partition spaces by determining a moving object, which is located in a predetermined indoor partition space, or an indoor partition space, in which a predetermined moving object is located, from the index between the indoor partition space and the moving object stored in the database.

5. The apparatus of claim 1, wherein the controller comprises:
   an indoor map manager configured to manage the indoor map;
   a positioning information manager configured to manage the positioning information;
   an indoor partition space manager configured to divide the indoor space into the indoor partition spaces in semantic units by use of information about the indoor map and the positioning information, and to manage the indoor partition spaces divided in the semantic units; and
   an index manager configured to store and manage a position relationship between the indoor partition space and the moving object as an index.

6. The apparatus of claim 5, wherein the indoor partition space manager determines movement of the moving object among the indoor partition spaces, and the index manager stores and manages an index that defines a position relationship between the indoor partition space and the moving object that is determined through the indoor partition space manager in the database.

7. The apparatus of claim 6, wherein the indoor partition space manager, when a predetermined positioning device senses a new moving object, receives sensing information from the predetermined positioning device, and determines that the new moving object has moved from an indoor partition space corresponding to a coverage of a previous positioning device to an indoor partition space corresponding to a coverage of the predetermined positioning device.

8. The apparatus of claim 6, wherein the indoor partition space manager, when a predetermined moving object senses a new positioning device, receives sensing information from the predetermined moving object, and determines that the predetermined moving object has moved from an indoor partition space corresponding to a coverage of a previous positioning device to an indoor partition space corresponding to a coverage of the new positioning device.

9. The apparatus of claim 6, wherein the index manager, when determined by the indoor partition space manager that the moving object has moved among the indoor partition spaces, updates the index between the moving object and the indoor partition space according to the movement of the moving object in the database.

10. The apparatus of claim 6, wherein the index manager searches for a moving object located in a predetermined indoor partition space or an indoor partition space in which a predetermined moving object is located, by use of the index between the indoor partition space and the moving object stored in the database.

11. The apparatus of claim 6, wherein the index between the indoor partition space and the moving object managed by the index manager is a spatial index or a spatiotemporal index.

12. The apparatus of claim 1, further comprising a communicator configured to receive an inquiry and a service request from a service requester to provide a processed result, and to receive position information about the moving object from the moving object or the positioning device.

13. A method of managing an indoor moving object, the method comprising:
    receiving an indoor map and positioning information of positioning devices;
    dividing an indoor space into indoor partition spaces in semantic units by use of the received indoor map and positioning information, wherein the indoor partition space in the semantic unit represents a space in which movement of a moving object is not limited due to a structure of the indoor space and which is included in a coverage of sets of the same positioning device; and
    generating an index that defines a relationship between the indoor partition space in the semantic unit and the moving object, and storing and managing the index in a database.

14. The method of claim 13, further comprising
    recognizing movement of the moving object among the indoor partition spaces by determining a moving object, which is located in a predetermined indoor partition space, or an indoor partition space, in which a predetermined moving object is located, from the index between the indoor partition space and the moving object stored in the database.

15. The method of claim 14, wherein further comprising, when recognized that the moving object has moved among the indoor partition spaces, updating the index between the moving object and the indoor partition space according to the movement of the moving object.

* * * * *